United States Patent [19]

Osako et al.

[11] Patent Number: 5,531,649
[45] Date of Patent: Jul. 2, 1996

[54] TOOTHED POWER TRANSMISSION BELT

[75] Inventors: Nobutaka Osako; Kazutoshi Ishida; Yasunori Nakai; Takeshi Murakami, all of Kobe, Japan

[73] Assignee: Mitsuboshi Belting Ltd., Kobe, Japan

[21] Appl. No.: 321,726

[22] Filed: Oct. 12, 1994

[30] Foreign Application Priority Data

Oct. 13, 1993 [JP] Japan ................... 5-280420

[51] Int. Cl.⁶ ................................................. F16G 1/28
[52] U.S. Cl. ............................................................ 474/205
[58] Field of Search .................................. 474/204, 205, 474/266–268, 271

[56] References Cited

U.S. PATENT DOCUMENTS

| | | | |
|---|---|---|---|
| 4,126,053 | 11/1978 | Cicognani | 474/265 X |
| 4,627,828 | 12/1986 | Nagai et al. | 474/205 |
| 4,632,665 | 12/1986 | Skura | 474/205 |
| 4,652,252 | 3/1987 | Westhoff et al. | 474/204 |
| 5,234,387 | 8/1993 | Fujiwara et al. | 474/205 |
| 5,306,213 | 4/1994 | Nakajima et al. | 474/205 |
| 5,405,299 | 4/1995 | Kubo et al. | 474/205 |

*Primary Examiner*—Roger J. Schoeppel
*Attorney, Agent, or Firm*—Wood, Phillips, VanSanten, Clark & Mortimer

[57] ABSTRACT

A power transmission belt having a belt body with a length, an inside, an outside, a backing layer, a plurality of longitudinally extending teeth, and a land surface between adjacent teeth facing in one of an inside and outside direction. At least one longitudinally extending cord is provided on the belt body. The distance between the land surface and the load carrying cord between the inside and outside of the belt is between 0.30 and 0.50 mm. The distance between the land surface and the center of the load carrying cord between the inside and outside of the belt is between 0.73 and 0.85 mm.

24 Claims, 4 Drawing Sheets

TOOTHED POWER TRANSMISSION BELT

BACKGROUND OF THE INVENTION

1. Field of the Invention

This invention relates to power transmission belts and, more particularly, to a power transmission belt having longitudinally spaced driving/driven teeth.

2. Background Art

It is known to use toothed belts with a pitch between 8.0mm and 9.25 mm to drive overhead cam shafts on vehicles. Recent developments in the automotive industry have resulted in higher engine output in a more compact engine compartment. As a result, toothed belts on these engines have been required to operate under high load, at high tension, and at high temperatures. This environment demands a high quality toothed belt capable of withstanding these severe conditions.

One attempt to improve conventional toothed belts to withstand these severe conditions has been to improve the materials from which the toothed belts are made. Instead of using conventional chloroprene rubber to define the teeth and an outside backing layer, hydrogenated nitrile rubber (HNBR), chlorosulfonated polyethylene (CSM), and the like have been utilized. The material of the load carrying cords has been changed from conventional E-glass to high strength glass and aramid fiber.

One example of a toothed belt using hydrogenated nitrile rubber and K-glass cords is disclosed in Unexamined Japanese Utility Model Publication 111848/1989. An example of a toothed belt using hydrogenated nitrile rubber aramid fiber cords is disclosed in Unexamined Japanese Patent Publication No. 215186/1993.

It is also known to change the composition of a fabric cover layer that is placed over the teeth on the inside of the belt body. One modification is to use aramid fiber in place of conventional 6 nylon and 6-6 nylon. An example of a toothed belt using aramid fiber in a fabric cover layer is disclosed in Unexamined Japanese Patent Publication No. 8948/1992.

While the above changes in the tooth and backing rubber, fabric cover layer, and load carrying cords has significantly improved heat resistance, abrasion resistance and resistance to chipping, these changes have resulted in other limitations and drawbacks.

The previously mentioned tooth pitch of 8.0 mm to 9.25 mm is measured along a hypothetical pitch line during running of a belt under a predetermined tension. The hypothetical pitch line is a hypothetical distance where a distance (PLD value) from the bottom land face to the pitch line is set at 0.686 ram, with the teeth of the belt in mesh with grooves on a cooperating pulley. It is a common practice in designing the cross section of toothed belts to make the distance between the bottom, inwardly facing land face between adjacent teeth and the center of the load carrying cords at 0.686 mm with the belt in a running state. The distance between the bottom land surface and the center of the cord is then between 0.68 and 0.72 mm with the belt in a stationary state.

With the above type of belt running, the land surface touches or is forced against the tip of a tooth on a cooperating pulley. This induces friction and causes abrasion between the land surface and the pulley tip. Additionally, frictional heat is generated which may degrade or cause failure of the load carrying cords. As the distance between the land surface and the load carrying cord is reduced, the detrimental effect caused by contact between the pulley tooth and land surface increases to the point that considerable degradation of the tensile strength of the load carrying cords may occur. This may ultimately result in belt failure.

SUMMARY OF THE INVENTION

The present invention is specifically directed to overcoming the above enumerated problems in a novel and simple manner by providing a toothed belt construction wherein load carrying cords are protected against damage with the belt in use. The invention is further directed to improving resistance to flexing fatigue and thereby lengthening the running life of the belt.

In one form, a power transmission belt is provided having a belt body with a length, an inside, an outside, a backing layer, a plurality of longitudinally extending teeth, and a land surface between adjacent teeth facing in one of an inside and outside direction. At least one longitudinally extending load carrying cord is provided on the belt body. The distance between the land surface and the load carrying cord between the inside and outside of the belt is between 0.30 and 0.50 mm. The distance between the land surface and the center of the load carrying cord between the inside and outside of the belt is between 0.73 and 0.85 mm.

In one form, the diameter of the load carrying cord is between 0.6 and 1.1 mm.

A fabric layer may be provided on the inside of the belt over the teeth and the land area, with there being a rubber layer between the fabric layer and the load carrying cord.

In one form, at least one of a) the backing layer and b) at least a portion of the teeth is made from rubber that is at least one of hydrogenated nitrile rubber, chlorosulfonated polyethylene (CSM), alkylated chlorosulfonated polystyrene (ACSM), and chloroprene. In the event that hydrogenated nitrile rubber is used, it is preferred that the hydrogenation rate be at least eighty percent.

The cord may be defined by glass filaments having a diameter of 5–9 μm.

The filaments may be treated with at least one of a) a rubber compound and b) RFL liquid.

The load carrying cord may be defined by organic fiber that is treated with at least one of a) RFL liquid, b) epoxy resin, c) isocyanate solution, and d) rubber compound adhesive.

The fabric layer may be defined by fibers that are at least one of 6 nylon, 6-6 nylon, polyester, and aramid fiber.

The fabric layer may have warp and weft yarns that are each at least one of filament yarn and spun yarn.

The fabric layer may be a plain weave, twill weave, or sateen weave.

The fabric layer may be treated with at least one of a) RFL liquid, b) isocyanate solution, and c) epoxy solution.

In another form of the invention, a power transmission belt is provided having a belt body with a length, an inside, an outside, a backing layer, a plurality of longitudinally spaced teeth, and a land surface between adjacent teeth and facing in one of an inside and outside direction. There is a fabric layer on the inside of the belt over the teeth and in the land area. There is further a plurality of longitudinally extending cords in the belt body, with the distance between the land surface and the load carrying cords between the inside and outside of the belt being between 0.30 and 0.50 mm. The distance between the land surface and the center of the load carrying cords between the inside and the outside of the belt is between 0.73 and 0.85 mm.

DETAILED DESCRIPTION OF THE DRAWING

Figure 1:
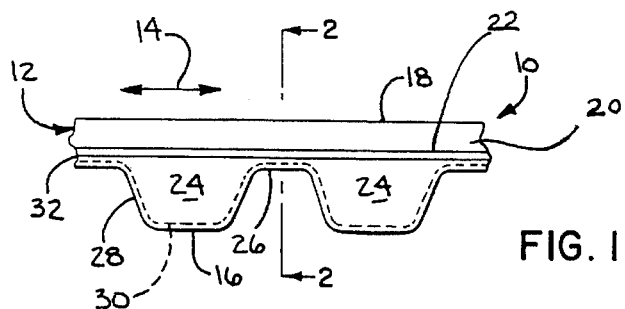
FIG. 1 is a fragmentary, side elevation view of a toothed power transmission belt, made according to the present invention.
Figure 2:
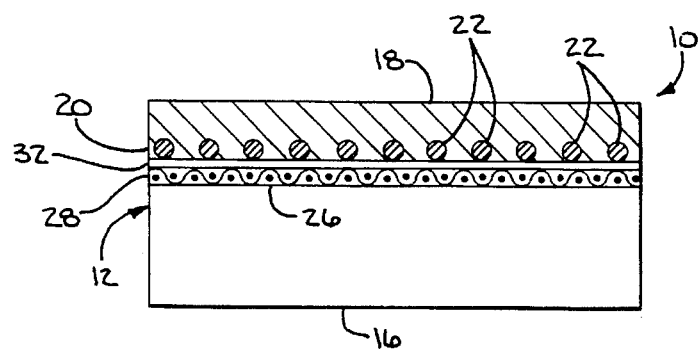
FIG. 2 is an enlarged, cross-sectional view of the toothed belt taken along line 2—2 of FIG. 1.
Figure 3:
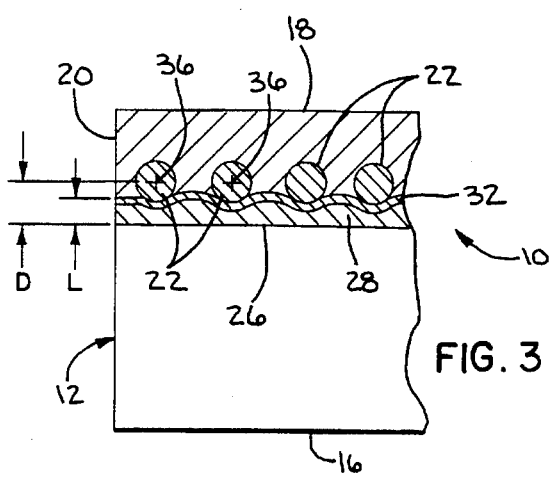
FIG. 3 is a further enlarged, fragmentary view of the power transmission belt, corresponding to that in FIG. 2.

In FIGS. 1–3, a toothed, power transmission belt, according to the present invention, is shown at 10. The belt 10 has a body 12 with a longitudinal extent in the direction of the double-headed arrow 14. The belt body 12 has an inside surface 16 and an outside surface 18.

The belt body has a backing layer 20 within which a plurality of longitudinally extending, laterally spaced, load carrying cords 22 are embedded. Inside of the load carrying cords 22 are a plurality of longitudinally spaced teeth 24. An inwardly facing, bottom land surface 26 is defined between adjacent teeth 24. A fabric layer 28 covers an inside surface 30 defined by the teeth 24 and the land area between the teeth 24 and defines the land surface. A thin rubber layer 32 resides between the fabric layer 28 and the load carrying cords 22. The rubber layer 32 and fabric layer 28 have a wavy pattern around the cords 22, as best seen in FIG. 3.

The thickness of the rubber layer 32 determines the distance (L), between the inwardmost land surface 26 defined by the fabric layer 28 and the load carrying cords 22, and also the distance (D), between the land surface 26 and the centers 36 of the load carrying cords 22.

Preferably, the teeth 24 and backing layer 20 are made from a rubber with good thermal aging resistance. A suitable rubber is any one of hydrogenated nitrile rubber, chlorosulfonated polyethylene (CSM), alkylated chlorosulfonated polystyrene (ACSM), and chloroprene. The hydrogenated nitrile rubber preferably has a hydrogenation rate of 80% or more. A hydrogenation rate of 90% or more is preferred to give optimal heat and ozone resistance. Hydrogenated nitrile rubber with a hydrogenation rate below 80% has inadequate heat and ozone resistance.

Carbon black, zinc oxide, stearic acid, plasticizer, antioxidant, and other ingredients can be added to the above rubber. Other agents can be added. Sulfur and organic peroxide may be added as a vulcanizing agent.

The load carrying cords 22 are prepared by twisting E-glass or other high strength glass filaments, each with a diameter of 5–9 μm, and treating the filaments with a protective agent with rubber compound or RFL liquid as an adhesive. An organic fiber may be used to define a twisted cord, using 0.5 to 2.5 denier filaments of para-aramid fiber, such as the type sold commercially under the trademarks "KEVLAR" and "TEKNORA". The resulting cord has a high tensile strength and resists elongation. The twisted cords are treated with at least one of RFL liquid, epoxy resin, isocyanate solution, and rubber compound adhesive. The precise composition of the cords is not, however, critical to the present invention.

The diameter of the load carrying cords 22 is preferably in the range of 0.6 to 1.10 mm. A cord having a diameter of less than 0.6 mm has a relatively low tensile strength and is unable to endure heavy load transmission. On the other hand, a cord having greater than 1.10 mm diameter is too large to be incorporated into a belt within normal dimensional limitations.

The layer 28 can be a canvas layer with fabric that is one, or a combination, of 6 nylon, 6-6 nylon, polyester, aramid fiber, or the like. The warp (widthwise of the belt) and the weft (lengthwise of the belt) are preferably made of filament yarn or spun yarn using the above type of fiber. The fabric may be a plain weave, twill weave or sateen weave. The weft preferably has a urethane elastic fiber to define at least a part thereof.

The fabric layer 28 is treated with RFL liquid, isocyanate solution, or epoxy solution. The RFL liquid is prepared by mixing a primary polycondensate of resorcinol and formalin with a latex. Examples of a suitable latex are: ternary copolymer of styrene, butadiene, and vinylpyridine; hydrogenated nitrile rubber; chlorosulfonated polyethylene; and epichlorohydrine.

An important aspect of the present invention is that the distance (L), between the bottom land surface 26 and the load carrying cords 22, is in the range of 0.30 and 0.50 mm. A distance of less than 0.30 mm may result in damage to the load carrying cords 22 resulting from shock generated at impact between a cooperating pulley tooth and the belt land surface 26. Also, with this distance (L) less than 0.30 mm, less proration is provided against thermal degradation of the load carrying cords 22 resulting from friction and abrasion between the belt 10 and a cooperating pulley in use. With the distance (L) above 0.50 mm, the belt becomes too thick, between the inside and outside thereof, for most applications.

The distance (D) between the land surface 26 and the center 36 of the load carrying cords 22 is a dimension relating to the cord diameter. The conventional PLD value ranges from 0.68 to 0.72 mm. According to the invention, this PLD value is 0.73 to 0.85 mm, i.e., somewhat larger than a conventional belt. With the distance (D) less than 0.73 mm, the dimension is that of a conventional belt. If the distance (D) exceeds 0.85 mm, tooth chipping is likely to occur by reason of the impact between the belt teeth 24 and a cooperating pulley in operation.

In designing conventional toothed power transmission belts, it is important to keep the relationship between the pulley dimension and the belt dimension within a predetermined range. A pulley for toothed belts in vehicles is commonly designed to place the belt pitch line at 0.686 mm outside of the pulley outer periphery. As a result, conventional toothed belts are designed to have a PLD value in the range of 0.68 to 0.72 mm. The belt length is also set in a predetermined range determined by multiplying the number of belt teeth by the belt pitch, with the number of belt teeth being counted under a given load corresponding to the belt width and tooth shape, as set out in ISO and JASO.

However, with the inventive belt, as described above, if the belt length is designed using the conventional procedure, described above, the resulting engagement of the belt and pulley may be improper. To overcome this problem, the standard value of the belt length is increased, or the outside diameter of the pulley may be changed so as to correspond to the PLD value.

Specific examples of the inventive belt are described below.

The fabric layers 28 were prepared using warp and weft yarns, described in Tables 1 and 2 below.

TABLE 1

| Facing Fabric | A-1-1 | A-1-2 | A-1-3 | A-2-1 | A-2-2 |
|---|---|---|---|---|---|
| Warp | | | | | |
| Material and diameter of Yarn | 66 Nylon 140 D D = denier | | | 66 Nylon 210 D | |
| Yarn density (number of yarns/5 cm) | 180 | | | 155 | |
| Weft | | | | | |
| Material and diameter of Yarn | 66 Nylon 280 D + urethane elastic fiber 140 D | | | 66 Nylon 420 D + urethane elastic fiber 140 D | |
| Yarn density (number of yarns/5 cm) | 160 | | | 135 | |
| Type of weaving | | | 2/2 twill fabric | | |
| Thickness of rubber layer (mm) | 0.20 | 0.35 | 0.50 | 0.20 | 0.35 |
| Thickness of facing fabric (mm) | 0.80 | 0.89 | 1.01 | 0.95 | 1.07 |

TABLE 2

| Facing Fabric | A-3-1 | A-3-2 | A-4-1 | A-4-2 |
|---|---|---|---|---|
| Warp | | | | |
| Material and diameter of Yarn | 66 Nylon 420 D D = denier | | aramid filament 400 D | |
| Yarn density (number of yarns/5 cm) | 115 | | 120 | |
| Weft | | | | |
| Material and diameter of Yarn | 66 Nylon 630 D + urethane elastic fiber 140 D | | aramid spun yarn 20's/3 yarn + urethane elastic fiber 140 D/1 yarn | |
| Yarn density (number of yarns/5 cm) | 160 | | 120 | |
| Type of weaving | | 2/2 twill fabric | | |
| Thickness of rubber layer (mm) | 0.20 | 0.35 | 0.20 | 0.35 |
| Thickness of facing fabric (mm) | 1.25 | 1.33 | 1.28 | 1.35 |

The fabrics were immersed in water and shaken to shrink to approximately one-half their original width. The fabrics were then immersed in a rubber adhesive having the composition in Table 3, below.

TABLE 3

| Rubber Adhesive | Weight Part |
|---|---|
| Rubber compound shown in the Table 4 (below) | 100 |
| PAPI-135 *5 | 50 |
| Methylethylketone | 850 |

*5 polymethylenepolyphenylisocyanate

After drying the fabrics were press-bonded with a rubber compound sheet having a thickness of 0.20 to 0.50 min. The rubber compound had a composition described in Table 4, below.

TABLE 4

| Ingredient | Weight Part |
|---|---|
| ZETPOL 2020 *1 | 100 |
| Zinc oxide | 5 |
| Stearic acid | 1 |
| Carbon black FEF | 50 |
| Antioxidant *2 | 2 |
| Plasticizer | 10 |
| Accelerator CM *3 | 1 |
| Accelerator TT *4 | 1 |
| Sulfur | 0.5 |

*1 Hydrogenated nitrile rubber commercially available from Nippon Zeon Co., Ltd.
*2 N-phenyl-N'-isopropyl-P-phenylenediamine (manufactured by Seiko Kagaku Co. Ltd.)
*3 N-cyclohexyl-2-benzothiazyl sulfonate (manufactured by Sanshin Kagaku Co. Ltd.)
*4 Tetramethylthiuram disulfide (manufactured by Sanshin Kagaku Co. Ltd.)

The combined fabrics were then used as the facing fabric layer 28. Table 1 shows the thickness of the individual facing fabrics.

To prepare the load carrying cords 22, filaments having the composition and diameter described in Table 5, below, were bundled in parallel relationship and immersed in RFL liquid, a protective agent, and an adhesive. After drying, the filament yarn was given a primary twist to form a thin rope. Several of the thin ropes were bundled in parallel relationship and given a final twist, in the reverse direction to the primary twist, to obtain a pair of twisted cords, with an S twist and a Z twist.

TABLE 5

| | Cord | | | |
|---|---|---|---|---|
| | B-1 | B-2 | B-3 | B-4 |
| Material | E glass | E glass | high strength glass | aramid |
| Thickness | 9 μm | 9 μm | 7 μm | 1.5 D |
| Structure | 150$^s$ –3/13 | 150$^s$ –3/13 | 225$^s$ –3/13 | 1500 D/2 yarns |
| Number of primary twists (Number/10 cm) | 16 | 12 | 12 | — |
| Number of final twists (Number/10 cm) | 8 | 8 | 8 | 15 |
| Diameter of cord after treatment (mm) | 1.2 | 1.1 | 0.9 | 0.7 |

Each of the fabric layers 28 in Tables 1 and 2 was formed into an endless, cylindrical shape. The cylindrical fabric was then set on a die. A pair of S and Z twist cords, as shown in Table 5, were alternatingly wound around the fabric layer 28 with a cord pitch and tension as specified in Table 6, below.

A rolled rubber compound sheet, described in Table 3, was wound over the cords 22 to define a belt sleeve. The fabric layer 28, cords 22 and rubber compound sheet were then vulcanized by a known pressure method. The vulcanized belt sleeve was then cut to a specified width to obtain each belt.

The resulting belts had 105 teeth, a width of 19.1 mm, and a tooth pitch of 8 mm. The shape of the teeth 24 was STPD.

Figure 4:
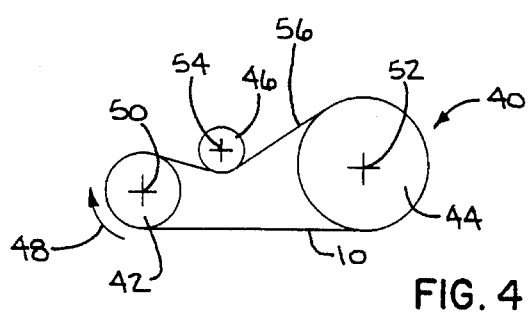
FIG. 4 is a schematic representation of a tri-axial test setup for testing heat generation on a running belt.
Figure 6:
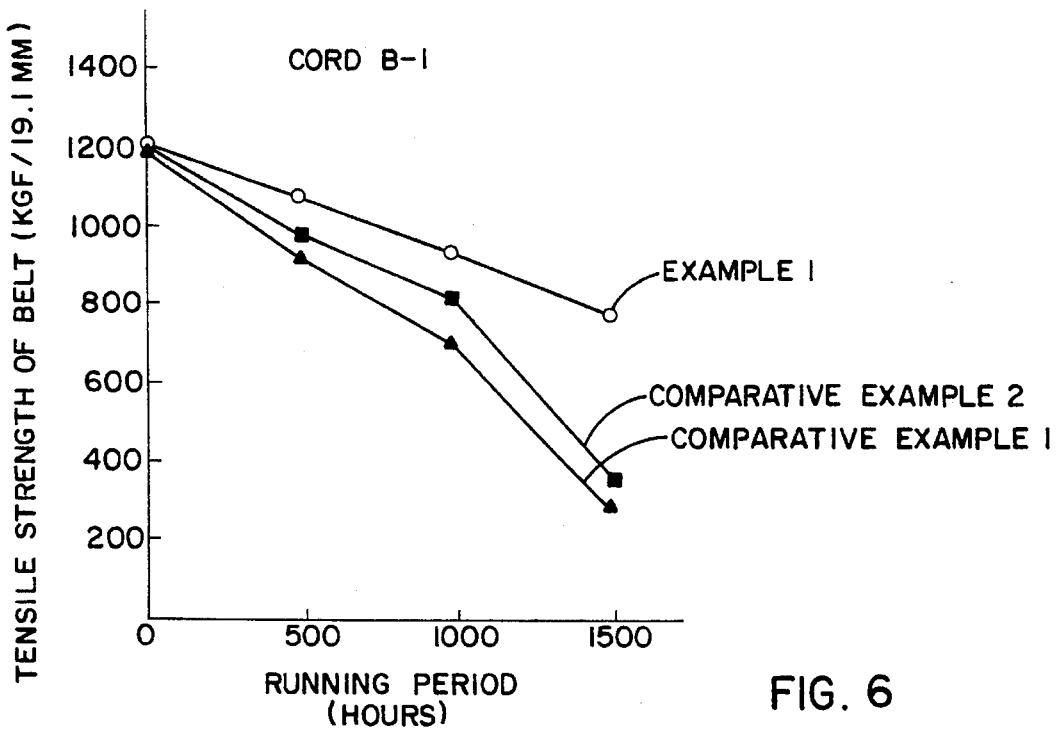
FIG. 6 is a graph showing the relationship between running time and tensile strength for an inventive belt and two conventional belts.
Figure 7:
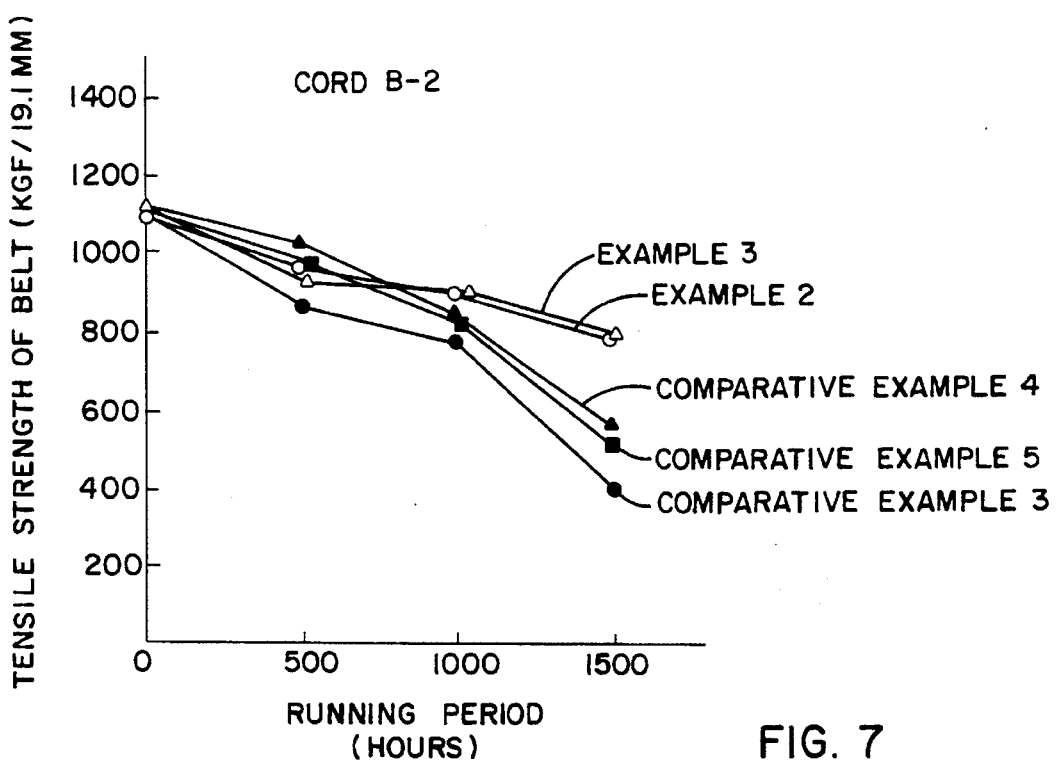
FIG. 7 is a graph showing the relationship between running time and tensile strength for two inventive belts and three conventional belts.
Figure 8:
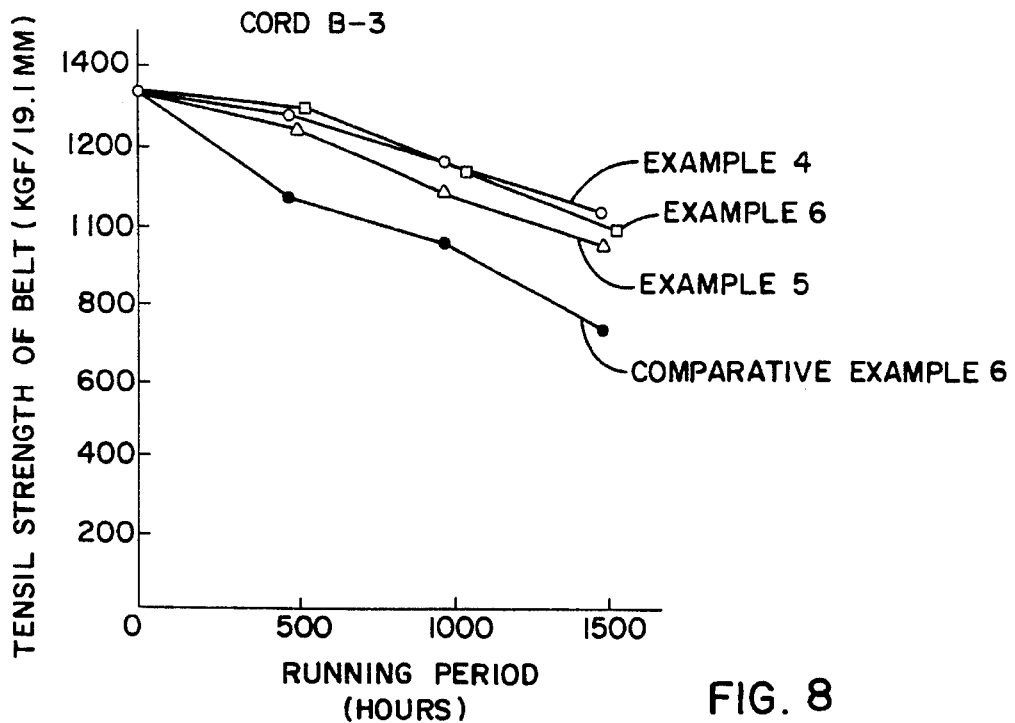
FIG. 8 is a graph showing the relationship between running time and tensile strength for three additional inventive belts and a conventional belt.
Figure 9:
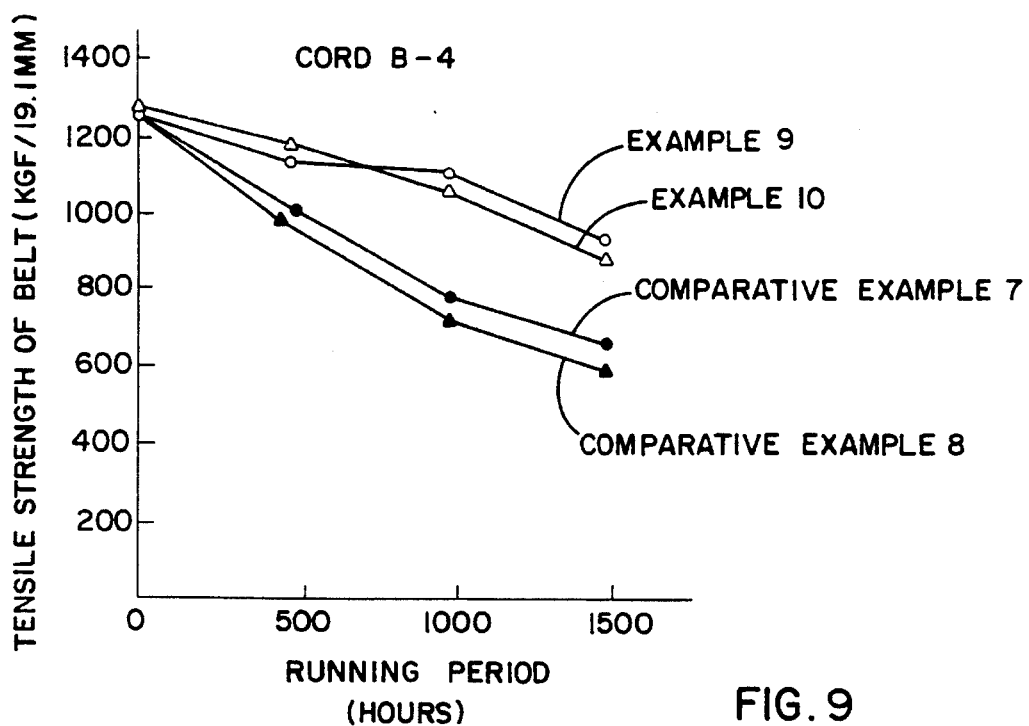
FIG. 9 is a graph showing the relationship between running time and tensile strength for two additional inventive belts and two additional conventional belts.

The sample belt 10 was mounted on a tri-axial, dynamic, test set-up, as shown schematically at 40 in FIG. 4, to determine the tensile strength of the belt 10 after a specified running period. The test set-up 40 included a drive pulley 42, with 21 teeth, a driven pulley 44, with 42 teeth, and a tensioning pulley 46 having a 52 mm diameter. The drive pulley 42 was advanced in the direction of the arrow 48 such that the drive pulley 42, driven pulley 44 and tensioning pulley 46 rotated about spaced, parallel axes 50, 52, 54, consecutively. The belt 10 was trained around the pulleys 42,44,46 so that the back face 56 thereof was engaged by the tensioning pulley 46.

The ambient temperature was 120° C. The drive pulley 42 was operated at 7200 rpm with a load on the driven pulley 44 of 5 ps. An initial tension of 15 kg/cm$^2$ was applied to the belt.

The belt tensile strength was measured after operation for 500, 1000 and 1500 hours. The results are summarized in Table 6. The relationship between the belt operating time

TABLE 6

| | INVENTIVE EXAMPLE | | | | | | | | | |
|---|---|---|---|---|---|---|---|---|---|---|
| | 1 | 2 | 3 | 4 | 5 | 6 | 7 | 8 | 9 | 10 |
| Facing fabric | A-1-3 | A-1-3 | A-2-2 | A-2-2 | A-3-1 | A-3-2 | A-4-1 | A-4-2 | A-3-2 | A-4-2 |
| Cord | B-1 | B-2 | B-2 | B-3 | B-3 | B-3 | B-3 | B-3 | B-4 | B-4 |
| Cord winding pitch (mm) | 1.40 | 1.30 | 1.30 | 1.20 | 1.20 | 1.20 | 1.20 | 1.20 | 0.9 | 0.9 |
| Cord winding tension (kgf/yarn) | 10 | 11 | 11 | 13 | 13 | 12 | 12 | 13 | 11 | 11 |
| Distance between bottom land surface and cord (mm) | 0.32 | 0.32 | 0.33 | 0.33 | 0.38 | 0.43 | 0.39 | 0.45 | 0.43 | 0.45 |
| Distance between bottom land surface and center of cord (mm) | 0.845 | 0.795 | 0.805 | 0.73 | 0.78 | 0.83 | 0.79 | 0.84 | 0.74 | 0.76 |
| Belt length between pulleys (mm) | 301.42 | 300.93 | 300.98 | 300.27 | 300.81 | 301.25 | 300.88 | 301.82 | 300.40 | 300.56 |
| Tensile strength of belt before running (kgf/19.1 mm) | 1210 | 1110 | 1115 | 1320 | 1330 | 1295 | 1315 | 1320 | 1245 | 1260 |
| Tensile strength of belt after tri-axial running tester (kgf/19.1 mm) | | | | | | | | | | |
| 500 hrs. | 1090 | 975 | 970 | 1175 | 1265 | 1245 | 1275 | 1190 | 1120 | 1160 |
| 1000 hrs. | 945 | 920 | 915 | 1056 | 1155 | 1075 | 1130 | 1110 | 1095 | 1060 |
| 1500 hrs. | 785 | 800 | 815 | 925 | 1025 | 945 | 985 | 925 | 920 | 880 |
| Running life of multi-axial running tester (hrs.) | 425 | 532 | 577 | 485 | 639 | 734 | 658 | 724 | 585 | 683 |
| Mode of defect | | | | | breakage of belt | | | | | | and the tensile strength of the belt, for each different type of belt, is shown in the graphs in FIGS. 6–9.

As can be seen from these test results, the inventive belt had a relatively small reduction in tensile strength after running on the test set-up 40 and had excellent flexing fatigue resistance.

Each of the above belts was cut to a width of 12.7 mm. The resulting belts were mounted on a multi-axial, dynamic test set-up as shown schematically at 60 in FIG. 5.

Figure 5:
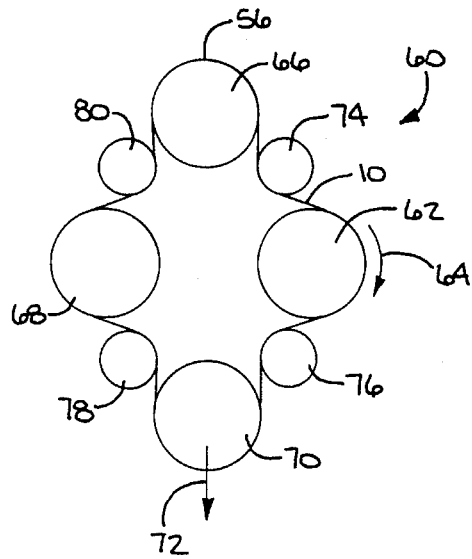
FIG. 5 is a schematic representation of a multi-axial test setup for testing flexing on a running belt.

The test set-up 60 had a drive pulley 62, with 24 teeth, driven in the direction of the arrow 64. The belt was trained around the drive pulley 62, two stationary, driven pulleys 66, 68, each having 24 teeth, and a driven pulley 70, with 24 teeth, movable in the line of the arrow 72. The pulleys 62,66,68,70 were symmetrically arranged as shown in FIG. 5. Idler pulleys 74,76,78,80, each having a 32 mm diameter, From the above test, it can be seen that the inventive belt had a small reduction in tensile strength after running on the tri-axial test set-up 60 and maintained excellent flexing fatigue resistance. Also, there was a small reduction in tensile strength after running on the test set-up 60, accounting for long belt life.

The conventional belt constructions, which were compared to the inventive belt, were prepared using the same procedures as in the above examples, with the construction of the facing fabric, cord, cord winding pitch, and cord winding tension summarized in Table 7, below. The belts were tested on the tri-axial test setup in FIG. 40 and the multi-axial test set-up 60 in FIGS. 4 and 5, respectively. The results are summarized in Table 7 and in FIGS. 6–11.

TABLE 7

| | COMPARATIVE EXAMPLE | | | | | | | |
|---|---|---|---|---|---|---|---|---|
| | 1 | 2 | 3 | 4 | 5 | 6 | 7 | 8 |
| Facing fabric | A-1-1 | A-1-2 | A-1-2 | A-3-1 | A-4-1 | A-2-1 | A-2-2 | A-1-3 |
| Cord | B-1 | B-1 | B-2 | B-2 | B-2 | B-3 | B-4 | B-4 |
| Cord winding pitch (mm) | 1.40 | 1.40 | 1.30 | 1.30 | 1.30 | 1.20 | 0.90 | 0.90 |
| Cord winding tension (kgf/yarn) | 12 | 12 | 12 | 10 | 10 | 13 | 12 | 12 |
| Distance between bottom land surface and cord (mm) | 0.15 | 0.24 | 0.24 | 0.38 | 0.39 | 0.23 | 0.33 | 0.32 |
| Distance between bottom land surface and center of cord (mm) | 0.68 | 0.765 | 0.715 | 0.860 | 0.870 | 0.630 | 0.640 | 0.630 |
| Belt length between pulleys (mm) | 299.90 | 300.55 | 300.01 | 301.52 | 301.62 | 299.37 | 299.43 | 299.33 |
| Tensile strength of belt before running (kgf/19.1 mm) | 1200 | 1220 | 1110 | 1120 | 1100 | 1325 | 1250 | 1255 |
| Tensile strength of belt after tri-axial running tester (kgf/19.1 mm) | | | | | | | | |
| 500 hrs. | 935 | 975 | 865 | 1040 | 990 | 1060 | 1000 | 980 |
| 1000 hrs. | 720 | 830 | 788 | 875 | 825 | 940 | 755 | 728 |
| 1500 hrs. | 310 | 366 | 410 | 580 | 550 | 730 | 650 | 600 |
| Running life of multi-axial running tester (hrs.) | 120 | 173 | 214 | 267 | 280 | 246 | 376 | 355 |
| Mode of defect | breakage of belt | | | | | tooth chipping | | | were placed between the pulleys 62,66,68,70 and pressed against the back face 56 of the belt 10.

The belts were run at an ambient temperature of 100° C. with an axial load of 60 kgf applied. The rotational speed of the drive pulley 62 was set at 550 rpm. The belt running speed was 17.6 m/sec.

Each belt was run on the test set-up 60 until it reached the end of its useful life. The time to failure and nature of the defect were determined. The results are summarized in Table 6.

Figure 10:
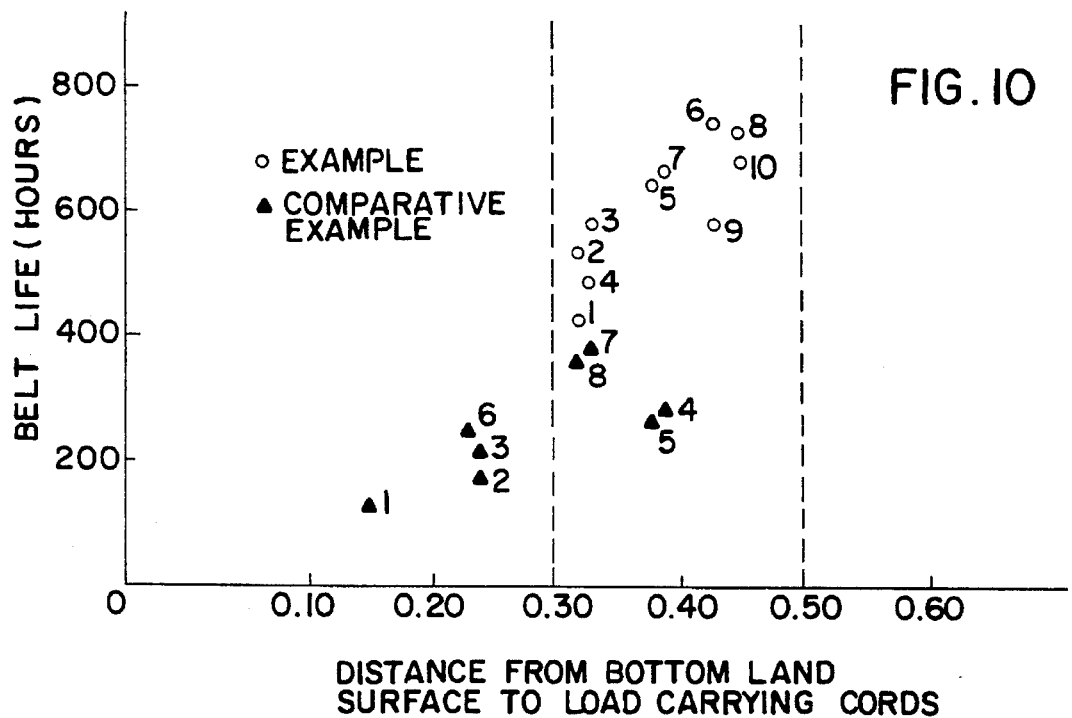
FIG. 10 is a graph showing the relationship between belt life and the distance from the bottom land surface to load carrying cords on both inventive and conventional belts.
Figure 11:
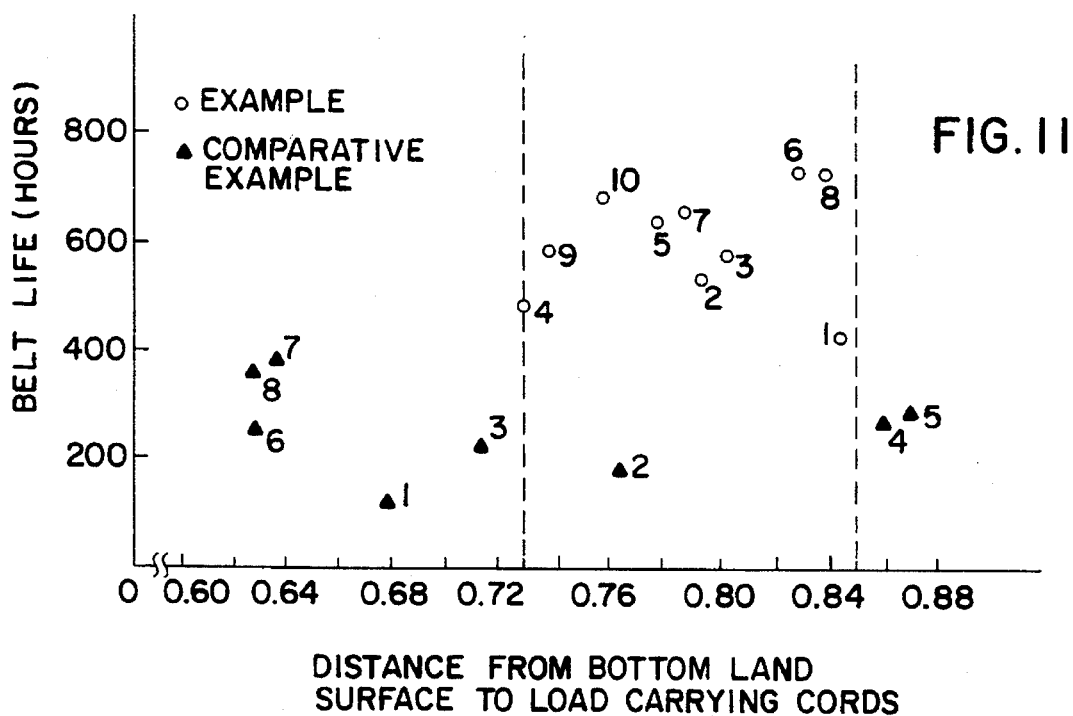
FIG. 11 is a graph showing the relationship between belt life and the distance from the bottom land surface to the load carrying cords for additional inventive and conventional belts.

FIGS. 10 and 11 are graphs showing the relationship between the tensile strength of the belt after running and the distance (L) between the bottom land surface and the cord. The like numbers attached to each symbol in FIGS. 10. and 11 correspond to the same belt.

The conventional belts had less flexing fatigue resistance, and a shorter life, than that of the inventive belts. The foregoing disclosure of specific embodiments is intended to be illustrative of the broad concepts comprehended by the invention.

We claim:

1. A power transmission belt comprising:

a belt body having a length, an inside, an outside, a backing layer, a plurality of longitudinally spaced teeth, and a land surface with portions between adjacent teeth and facing in one of an inside and outside direction, there being at least one longitudinally extending load carrying cord in the belt body, said load carrying cord having a diameter and a center, wherein the distance between the land surface and the load carrying cord as measured from one of the inside and outside of the belt is between 0.30 and 0.50 mm, further wherein the distance between the land surface and the center of the load carrying cord as measured from one of the inside and outside of the belt is between 0.73 and 0.85 mm, there further being a rubber layer between the one of the inside and outside of the belt and the load carrying cord along the entire length of the belt.

2. The power transmission belt according to claim 1 wherein the diameter of the load carrying cord is between 0.6 and 1.1 mm.

3. The power transmission belt according to claim 1 wherein there is a fabric layer on the inside of the belt over the teeth and defining the land surface and the rubber layer is disposed between the fabric layer and the load carrying cord.

4. The power transmission belt according to claim 1 wherein at least one of a) the backing layer and b) at least a portion of the teeth is made from rubber that is at least one of hydrogenated nitrile rubber, chlorosulfonated polyethylene (CSM), alkylated chlorosulfonated polystyrene (ACSM), and chloroprene.

5. The power transmission belt according to claim 1 wherein at least one of a) the backing layer and b) at least a portion of the teeth is made from hydrogenated nitrile rubber with a hydrogenation rate of at least 80%.

6. The power transmission belt according to claim 1 wherein the cord is defined by glass filaments having a diameter of 5 to 9 μm.

7. The power transmission belt according to claim 6 wherein the glass filaments are treated with at least one of a) a rubber compound and b) RFL liquid.

8. The power transmission belt according to claim 1 wherein the load carrying cord is defined by organic fiber that is treated with at least one of a) RFL liquid, b) epoxy resin, c) isocyanate solution, and d) rubber compound adhesive.

9. The power transmission belt according to claim 3 wherein the fabric layer is a canvas layer defined by fibers that are at least one of 6 nylon, 6-6 nylon, polyester and aramid fiber.

10. The power transmission belt according to claim 9 wherein the fabric layer has warp and weft yarns each comprising at least one of filament yarn and spun yarn.

11. The power transmission belt according to claim 10 wherein the fabric layer comprises one of a plain weave, twill weave, and sateen weave.

12. The power transmission belt according to claim 9 wherein the fabric layer is treated with at least one of a) RFL liquid, b) isocyanate solution, and c) epoxy solution.

13. A power transmission belt comprising:

a belt body having a length, an inside, an outside, a backing layer, a plurality of longitudinally spaced teeth, and a land surface with portions between adjacent teeth and facing in one of an inside and outside direction, there being a fabric layer on the inside of the belt over the teeth and the land surface, there being a plurality of longitudinally extending load carrying cords in the belt body, said load carrying cords having substantially equal diameters and each having a center, wherein the distance between the land surface and the loading carrying cords as measured from one of the inside and outside of the belt is between 0.30 and 0.50 mm, further wherein the distance between the land surface and the center of the load carrying cords as measured from one of the inside and outside of the belt is between 0.73 and 0.85 mm, there further being a rubber layer between the one of the inside and outside of the belt and the loading carrying cords along the entire length of the belt.

14. The power transmission belt according to claim 13 wherein the diameter of the load carrying cords is between 0.6 and 1.1 mm.

15. The power transmission belt according to claim 14 wherein there is a fabric layer on the inside of the belt over the teeth and defining the land surface and the rubber layer is disposed between the fabric layer and the load carrying cord.

16. The power transmission belt according to claim 15 wherein at least one of a) the backing layer and b) at least a portion of the teeth is made from rubber that is at least one of hydrogenated nitrile rubber, chlorosulfonated polyethylene (CSM), alkylated chlorosulfonated polystyrene (ACSM), and chloroprene.

17. The power transmission belt according to claim 16 where the load carrying cords are defined by glass filaments having a diameter of 5 to 9 μm.

18. The power transmission belt according to claim 17 wherein the glass filaments are treated with at least one of a) a rubber compound and b) RFL liquid.

19. The power transmission belt according to claim 16 wherein the load carrying cords are defined by organic fiber that is treated with at least one of a) RFL liquid, b) epoxy resin, c) isocyanate solution, and d) rubber compound adhesive.

20. The power transmission belt according to claim 19 wherein the fabric layer is a canvas layer defined by fibers that are at least one of 6 nylon, 6-6 nylon, polyester, and aramid fiber.

21. The power transmission belt according to claim 20 where the fabric layer has warp and weft yarns comprising at least one of filament yarn and spun yarn.

22. The power transmission belt according to claim 20 wherein the fabric layer comprises one of a plain weave, twill weave, and sateen weave.

23. The power transmission belt according to claim 22 wherein the fabric layer is treated with at least one of a) RFL liquid, b) isocyanate solution, and c) epoxy solution.

24. The power transmission belt according to claim 23 wherein the pitch of the teeth is between 8.0 and 9.25 mm.

* * * * *